United States Patent
Cho et al.

(10) Patent No.: US 10,171,782 B2
(45) Date of Patent: Jan. 1, 2019

(54) IMAGE SENSOR AND METHOD OF GENERATING RESTORATION IMAGE

(71) Applicant: Samsung Electronics Co., Ltd., Suwon-si, Gyeonggi-do (KR)

(72) Inventors: Yang Ho Cho, Seongnam-si (KR); Dong Kyung Nam, Yongin-si (KR); Byong Min Kang, Yongin-si (KR); Hyoseok Hwang, Suwon-si (KR); Du-Sik Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/386,774

(22) Filed: Dec. 21, 2016

(65) Prior Publication Data
US 2017/0237957 A1    Aug. 17, 2017

(30) Foreign Application Priority Data
Feb. 15, 2016  (KR) ........................ 10-2016-0017138

(51) Int. Cl.
*H04N 9/43*   (2006.01)
*H04N 9/04*   (2006.01)
*H04N 5/374*  (2011.01)

(52) U.S. Cl.
CPC ............. *H04N 9/43* (2013.01); *H04N 9/045* (2013.01); *H04N 5/374* (2013.01); *H04N 2209/047* (2013.01)

(58) Field of Classification Search
CPC ........... H04N 9/43; H04N 9/045; H04N 5/374
See application file for complete search history.

(56) References Cited

U.S. PATENT DOCUMENTS

| | | | |
|---|---|---|---|
| 5,055,921 A | 10/1991 | Usui | |
| 5,121,192 A * | 6/1992 | Kazui | H01L 27/14868 257/E27.159 |
| 5,485,293 A * | 1/1996 | Robinder | G02F 1/1368 345/88 |
| 6,961,157 B2 | 11/2005 | Tandon et al. | |
| 7,400,332 B2 * | 7/2008 | Schweng | H04N 9/045 345/589 |
| 7,414,630 B2 * | 8/2008 | Schweng | H04N 9/045 345/589 |
| 8,125,546 B2 * | 2/2012 | Adams, Jr. | H01L 27/14621 348/273 |
| 8,139,130 B2 | 3/2012 | Compton et al. | |
| 8,164,651 B2 * | 4/2012 | Hamilton, Jr. | H04N 5/235 348/229.1 |
| 8,253,832 B2 * | 8/2012 | Adams, Jr. | G06T 3/00 348/271 |
| 8,547,394 B2 * | 10/2013 | Swic | G09G 5/02 345/55 |

(Continued)

FOREIGN PATENT DOCUMENTS

JP    2008078922 A    4/2008

*Primary Examiner* — Nicholas G Giles
(74) *Attorney, Agent, or Firm* — Harness, Dickey & Pierce, P.L.C.

(57) ABSTRACT

An image sensor includes a plurality of non-color pixel sensors each configured to sense a non-color signal; and a color pixel sensing region including at least one color pixel sensor configured to sense a color signal, wherein the color pixel sensing region has an area physically greater than an area of each of the non-color pixel sensors.

16 Claims, 11 Drawing Sheets

(56) References Cited

U.S. PATENT DOCUMENTS

| | | | |
|---|---|---|---|
| 8,565,522 B2* | 10/2013 | Swic | G09G 5/02 345/589 |
| 9,160,935 B2 | 10/2015 | Schweng et al. | |
| 9,739,914 B2* | 8/2017 | Tuulos | G02B 5/20 |
| 2002/0093697 A1 | 7/2002 | Spears et al. | |
| 2003/0086008 A1* | 5/2003 | Nagano | H04N 9/045 348/272 |
| 2006/0146067 A1* | 7/2006 | Schweng | H04N 9/045 345/591 |
| 2007/0024931 A1* | 2/2007 | Compton | H04N 9/045 358/512 |
| 2007/0076269 A1* | 4/2007 | Kido | H04N 5/23245 358/474 |
| 2008/0012969 A1* | 1/2008 | Kasai | H04N 5/23232 348/266 |
| 2008/0278599 A1* | 11/2008 | Shiohara | H04N 1/00161 348/222.1 |
| 2009/0268055 A1* | 10/2009 | Hamilton, Jr. | H04N 5/235 348/230.1 |
| 2011/0157395 A1* | 6/2011 | Compton | H04N 5/335 348/222.1 |
| 2011/0285713 A1* | 11/2011 | Swic | G09G 5/02 345/428 |
| 2011/0285714 A1* | 11/2011 | Swic | G09G 5/02 345/428 |
| 2011/0285746 A1* | 11/2011 | Swic | G09G 5/02 345/597 |
| 2013/0168795 A1* | 7/2013 | Tuulos | H01L 27/14621 257/443 |
| 2014/0078366 A1* | 3/2014 | Dokoutchaev | H04N 5/2254 348/302 |
| 2014/0313366 A1* | 10/2014 | Lee | H04N 5/23229 348/222.1 |
| 2014/0354861 A1* | 12/2014 | Pang | H04N 5/365 348/242 |
| 2015/0054997 A1* | 2/2015 | Hynecek | H01L 27/14643 348/302 |
| 2016/0037109 A1* | 2/2016 | Vogelsong | H04N 9/045 348/216.1 |
| 2016/0311443 A1* | 10/2016 | Hong | H04N 13/0271 |
| 2017/0006278 A1* | 1/2017 | Vandame | H01L 27/14621 |

* cited by examiner

IMAGE SENSOR AND METHOD OF GENERATING RESTORATION IMAGE

CROSS-REFERENCE TO RELATED APPLICATION

This application claims priority benefit under 35 U.S.C. § 119 of Korean Patent Application No. 10-2016-0017138, filed on Feb. 15, 2016, at the Korean Intellectual Property Office, the entire contents of which are incorporated herein by reference.

BACKGROUND

1. Field

At least one example embodiment relates to an image sensor and a method of restoring an image photographed by the image sensor, and more particularly, to a structure of the image sensor.

2. Description of the Related Art

An image sensor may be a semiconductor device that detects light reflected by a subject and convert the light to an electric signal. The image sensor may be widely used in electronic devices such as a digital camera and a cellular phone. Such image sensor may include a charged coupled device (CCD) image sensor and a complementary metal oxide semiconductor (CMOS) image sensor. The CMOS image sensor may receive more attention due to ease of integration with a neighboring circuit, low manufacturing costs, and low power consumption.

SUMMARY

Some example embodiments relate to an image sensor.

According to at least some example embodiments, an image sensor includes a plurality of non-color pixel sensors each configured to sense a non-color signal; and a color pixel sensing region including at least one color pixel sensor configured to sense a color signal, wherein the color pixel sensing region has an area physically greater than an area of each of the non-color pixel sensors.

The color pixel sensing region may be encompassed by the non-color pixel sensors.

Each of the non-color pixel sensors may be a panchromatic pixel sensor.

In a pixel array of the image sensor, a proportion of an area of the color pixel sensing region to an entire area of the pixel array may be less than a proportion of an area of a non-color pixel sensing region to the entire area of the pixel array, and the non-color pixel sensing region may include the non-color pixel sensors.

The color pixel sensing region may be configured to sense at least two colors from among red, green, blue, magenta, yellow, and cyan.

A distance between color pixel sensing regions included in the pixel array may be determined based on the proportion of the area of the non-color pixel sensing region to the entire area of the pixel array.

The area of the color pixel sensing region may be a multiple of the area of each of the non-color pixel sensors, and the multiple may be a real number greater than or equal to 2 and less than or equal to 9.

The color pixel sensing region may include one color pixel sensor configured to receive a wavelength indicating at least one color from among red, green, blue, magenta, yellow, and cyan.

The color pixel sensing region may include a plurality of color pixel sensors each configured to receive a wavelength indicating at least one color from among red, green, blue, magenta, yellow, and cyan.

According to at least some example embodiments, an image sensor includes a plurality of non-color pixel sensors each configured to sense a non-color signal; and a color pixel sensing region including at least one color pixel sensor configured to sense a color signal, wherein the color pixel sensing region is encompassed by the non-color pixel sensors.

The color pixel sensing region may have an area physically greater than an area of each of the non-color pixel sensors.

In a pixel array of the image sensor, a proportion of an area of the color pixel sensing region to an entire area of the pixel array may be less than a proportion of an area of a non-color pixel sensing region to the entire area of the pixel array, the non-color pixel sensing region including the non-color pixel sensors.

The color pixel sensing region may be configured to sense at least two colors from among red, green, blue, magenta, yellow, and cyan in the pixel array.

A distance between color pixel sensing regions included in the pixel array may be determined based on the proportion of the area of the non-color pixel sensing region to the entire area of the pixel array.

The color pixel sensing region may include a plurality of color pixel sensors each configured to receive a wavelength indicating at least one color from among red, green, blue, magenta, yellow, and cyan.

According to at least some example embodiments, a method of generating a restoration image may include receiving an initial image from an image sensor; determining a panchromatic pixel value corresponding to a color pixel among pixels of the initial image; generating a panchromatic image by setting the panchromatic pixel value to the color pixel; and generating a restoration image based on a color pixel value of the color pixel of the initial image and the panchromatic image, wherein the initial image includes a plurality of non-color pixels and one or more color pixel regions, and each of the one or more color pixel regions has an area physically greater than an area of each of the non-color pixels.

Each of the one or more color pixel regions may be encompassed by the non-color pixels.

The generating of the restoration image may include generating the restoration image by diffusing the color pixel value of the initial image to the panchromatic image.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

<Outline of an Image Sensor>

Figure 1:
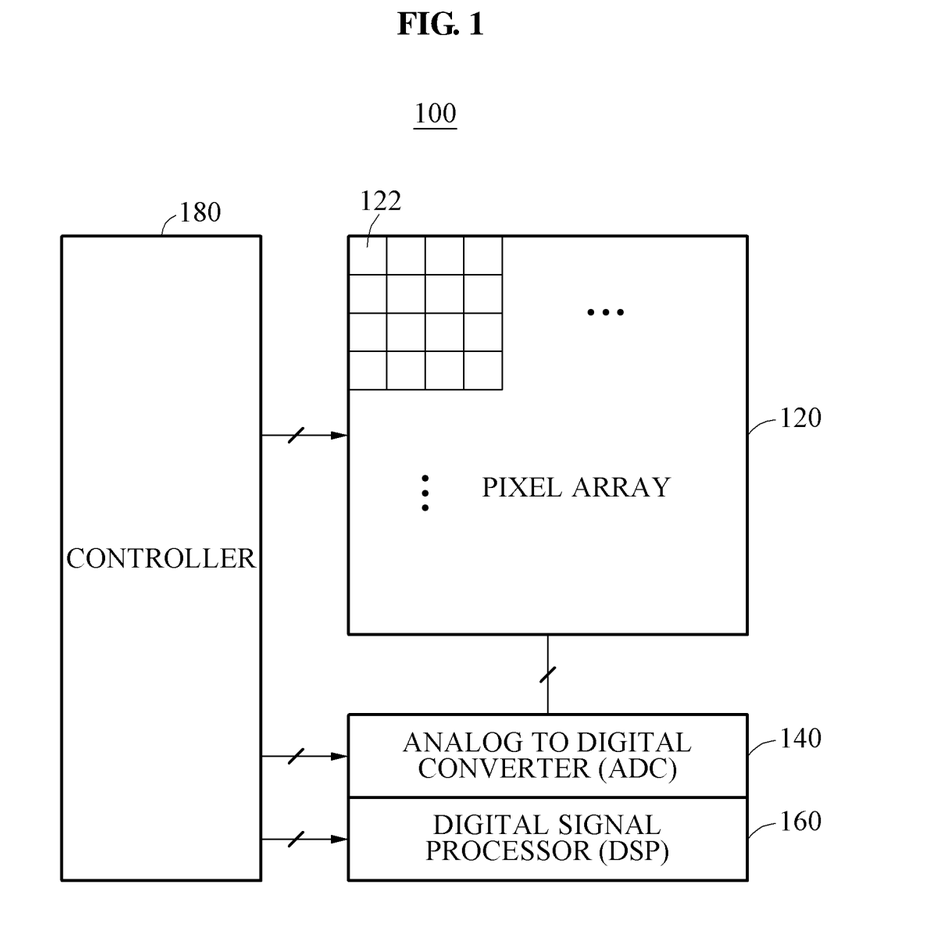
FIG. 1 is a block diagram illustrating an image sensor according to at least one example embodiment.

FIG. 1 is a block diagram illustrating an image sensor according to at least one example embodiment.

Referring to FIG. 1, an image sensor 100 includes a pixel array 120, an analog to digital converter (ADC) 140, a digital signal processor (DSP) 160, and a controller 180 to control the pixel array 120, the ADC 140 and the DSP 160.

The pixel array 120 includes unit pixel sensors 122 and row lines and column lines connected to the unit pixel sensors 122. For example, the row lines and the column lines are crossed and thus, the unit pixel sensors 122 may be disposed in a matrix form in the pixel array 120.

A pixel sensor to detect visible light (e.g., each of the unit pixel sensors 122 of the pixel array 120) may include a photoelectric conversion circuit and a signal generating circuit to generate an electric signal corresponding to an accumulated amount of charge to which the visible light is converted.

Each unit pixel may include a visible light detecting layer including a filter layer and a silicon (Si) layer.

The visible light detecting layer may convert the visible light incident from an outside through the filter layer to a first charge using a photoelectric conversion transducer formed on the silicon layer. For example, the photoelectric conversion transducer may be a photodiode.

A structure of the image sensor 100 is only an example. However, the structure of the image sensor is not limited to the aforementioned example.

According to at least some example embodiments, when the image sensor 100 adopts a Bayer pattern scheme, the filter layer may include a non-color filter, a red filter, a green filter, and a blue filter. According to at least some example embodiments, the filter layer may include the non-color filter, a magenta filter, a yellow filter, and a cyan filter.

When the filter layer includes the non-color filter, the unit pixel sensors 122 may be non-color pixel sensors. For example, a non-color pixel sensor may be a panchromatic pixel sensor or a mono pixel sensor. The non-color filter may be referred to as a filter that allows all wavelengths of all lights passing through the filter. The panchromatic pixel sensor and the mono pixel sensor may be used in an identical manner.

When the filter layer includes color filters such as the red filter, the green filter, and the blue filter, the unit pixel sensors 122 may be color pixel sensors. For example, when the filter layer includes the red filter, a color pixel sensor may receive a light within a light wavelength range indicating a red color.

For example, an area of a light receiving region of the non-color pixel sensor may be different from an area of a light receiving region of the color pixel sensor. Detailed descriptions of pixel sensors of which light receiving regions are different will be provided with reference to FIGS. 2 through 8.

The ADC 140 converts, to a digital signal, an analog signal corresponding to the electric signal output from the pixel array 120. To convert the analog signal to the digital signal, the ADC 140 may include a plurality of ADCs. The ADC 140 converts, to the digital signal, the electric signal, for example, an analog signal, output from the pixel array 120, and the electric signal may correspond to the accumulated amount of charge to which the visual light is converted.

The DSP 160 generates an image signal by performing digital signal processing on the digital signal. The DSP 160 receives the digital signal from the ADC 140 and performs the digital signal processing on the digital signal. For example, the DSP 160 performs image interpolation, color correction, white balancing, gamma correction, and color conversion. According to at least some example embodiments, the digital signal output from the ADC 140 is amplified by an amplifier circuit (not illustrated) and then supplied to the DSP 160.

According to at least some example embodiments, the DSP 160 outputs a first image signal by performing the digital signal processing on a first digital signal associated with the accumulated amount of the charge to which the visual light is converted. The image generated by the image sensor 100 may be referred to as an initial image.

The controller 180 controls the pixel array 120, the ADC 140, and the DSP 160. The controller 180 generates various signals, for example, a clock signal and a timing control signal, used for operations of the pixel array 120, the ADC 140, and the DSP 160.

<A Structure of a Pixel Array of which an Area of a Color Pixel Sensor is Greater than an Area of a Non-Color Pixel Sensor>

Figure 2:
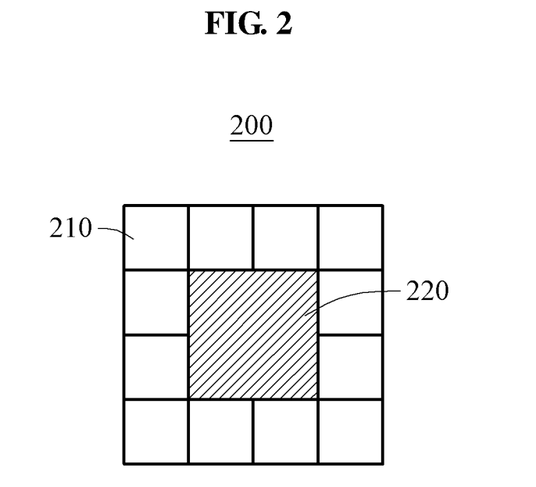
FIG. 2 is a diagram illustrating a pixel array according to at least one example embodiment.

FIG. 2 is a diagram illustrating a pixel array according to at least one example embodiment.

The pixel array 120 includes a plurality of pixel sensors. FIG. 2 illustrates a pixel pattern 200 included in the pixel array 120. For example, the pixel array 120 may include a plurality of pixel patterns.

The pixel pattern 200 may include a plurality of non-color pixel sensors, for example, a non-color pixel sensor 210, each to sense a non-color signal and at least one color pixel sensor 220 to sense a color signal. A region including a plurality of non-color pixel sensors is referred to as a non-color pixel sensing region, and a region including a color pixel sensor is referred to as a color pixel sensing region. According to at least some example embodiments, the non-color pixel sensor 210 may be a panchromatic pixel sensor, and the color pixel sensor 220 may be a color pixel sensor to receive at least one color of red, green, or blue. According to at least some example embodiments, the non-color pixel sensor 210 may be a panchromatic pixel sensor, and the color pixel sensor 220 may be a color pixel sensor to receive a light having at least one color of magenta, yellow, or cyan.

According to at least some example embodiments, an area of a color pixel sensor may be physically greater than an area of a non-color pixel sensor. For example, the area of the color pixel sensor may be a multiple of the area of the non-color pixel sensor, and the multiple may be a real number greater than or equal to 2 and less than or equal to 9. An "area" and a "size" of a pixel sensor may have an identical meaning and may be used interchangeably. When the area of the color pixel sensor is greater than the area of the non-color pixel sensor, each color pixel sensing region may include one color pixel sensor.

When the area of the color pixel sensor is physically greater than the area of the non-color pixel sensor, the color pixel sensor may be disposed to be encompassed by a plurality of non-color pixel sensors. Concisely, a color pixel sensing region may be encompassed by a plurality of non-color pixel sensors.

When a pixel array includes the pixel pattern 200, an area proportion of a color pixel sensing region may be less than an area proportion of a non-color pixel sensing region including a plurality of non-color pixel sensors. The area proportion of the color pixel sensing region is a proportion of the area of the color pixel sensing region with respect to an entire area of the pixel pattern 200. In the pixel pattern 200, the area proportion of the color pixel sensing region is 25%, and the area proportion of the non-color pixel sensing region is 75%.

When the area proportion of the color pixel sensing region is decreased, the area proportion of the non-color pixel sensing region is increased and thus, an amount of light received for an identical amount of time may be increased. When the amount of the light received for the identical amount of time is increased, an ability of an image sensor to generate a high-resolution image even in a low light environment may increase.

According to at least some example embodiments, since an amount of light received by the color pixel sensor and an amount of light received by the non-color pixel sensor for the identical amount of time are different, a brightness of a color pixel sensed by the color pixel sensor may be different from a brightness of a non-color pixel sensed by the non-color pixel sensor. An amount of time for the color pixel sensor to receive light and an amount of time for the non-color pixel sensor to receive light may be differently set in order for the brightness of the color pixel to be sensed as similar to the brightness of the non-color pixel. For example, the amount of time for the color pixel sensor to receive light may be greater than the amount of time for the non-color pixel sensor to receive light.

FIGS. 3 through 8 illustrate pixel arrays including a plurality of color pixel sensing regions according to at least one example embodiment.

Figure 3:
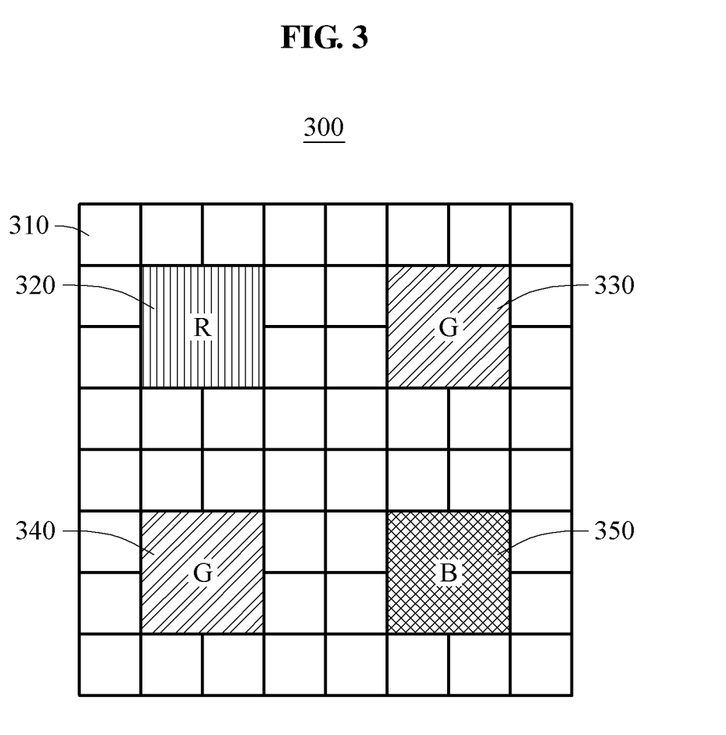
FIG. 3 is a diagram illustrating an example of when each color pixel sensing region does not share a non-color pixel sensor according to at least one example embodiment.

FIG. 3 is a diagram illustrating an example of when each color pixel sensing region does not share a non-color pixel sensor according to at least one example embodiment. A pixel pattern of a pixel array 300 illustrated in FIG. 3 may be identical to the pixel pattern 200 of FIG. 2.

The pixel array 300 includes a plurality of non-color pixel sensors, for example, a non-color pixel sensor 310, and a plurality of color pixel sensors 320, 330, 340, and 350. The color pixel sensors 320, 330, 340, and 350 may be encompassed by the non-color pixel sensors. Concisely, each of color pixel sensing regions may be encompassed by a plurality of non-color pixels sensors.

According to at least some example embodiments, the color pixel sensing regions may be disposed to sense at least two colors of red, green, or blue in the pixel array 300. For example, a color pixel sensing region including the color pixel sensor 320 may sense red, a color pixel sensing region including the color pixel sensor 330 or the color pixel sensor 340 may sense green, and a color pixel sensing region including the color pixel sensor 350 may sense blue.

According to at least some example embodiments, the color pixel sensing regions may be disposed to sense at least two colors of magenta, yellow, or cyan in the pixel array 300.

Since the pixel pattern of the pixel array 300 illustrated in FIG. 3 is identical to the pixel pattern 200 of FIG. 2, an area proportion of the color pixel sensing regions is 25% and an area proportion of the non-color pixel sensing regions is 75%.

Figure 4:
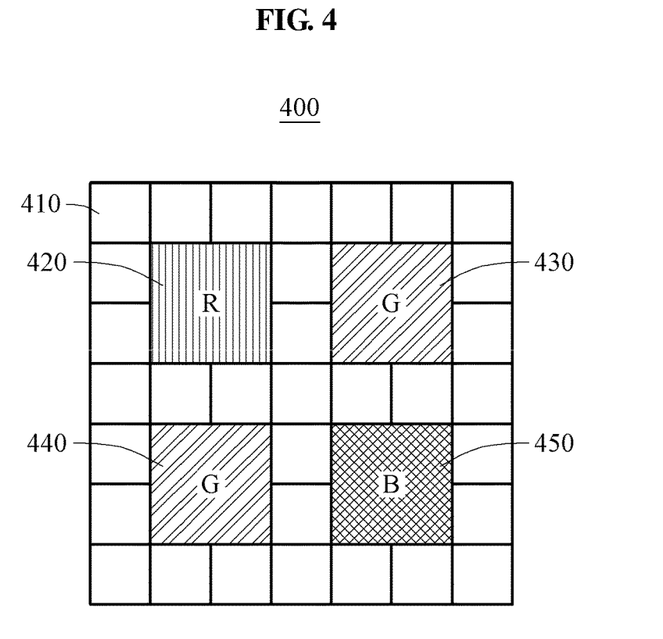
FIG. 4 is a diagram illustrating an example of when a color pixel sensing region shares a non-color pixel sensor with another color pixel sensing region according to at least one example embodiment.

FIG. 4 is a diagram illustrating an example of when a color pixel sensing region shares a non-color pixel sensor with another color pixel sensing region according to at least one example embodiment.

A pixel array 400 includes a plurality of non-color pixel sensors 410, for example, a non-color pixel sensor 410, and a plurality of color pixel sensors 420, 430, 440, and 450. Each of the color pixel sensors 420, 430, 440, and 450 may be encompassed by the non-color pixel sensors. Concisely, each of color pixel sensing regions may be encompassed by a plurality of non-color pixel sensors.

According to at least some example embodiments, the color pixel sensing regions may be disposed to sense at least two color of red, green, or red in the pixel array 400. For example, a color pixel sensing region including the color pixel sensor 420 may sense red, a color pixel sensing region including the color pixel sensor 430 or the color pixel sensor 440 may sense green, and a color pixel sensing region including the color pixel sensor 450 may sense blue.

According to at least some example embodiments, the color pixel sensing regions may be disposed to sense at least two colors of magenta, yellow, or cyan in the pixel array 400.

In the pixel array 400, an area proportion of color pixel sensing regions is 32.65%, and an area proportion of non-color pixel sensing regions 67.32%. Based on a comparison with the pixel array 300 of FIG. 3, the area proportion of the color pixel sensing regions of the pixel array 400 is greater than the area proportion of the color pixel sensing regions of the pixel array 300, such that an amount of light received in pixel array 400 may be smaller than the amount of light received in the pixel array 300.

Figure 5:
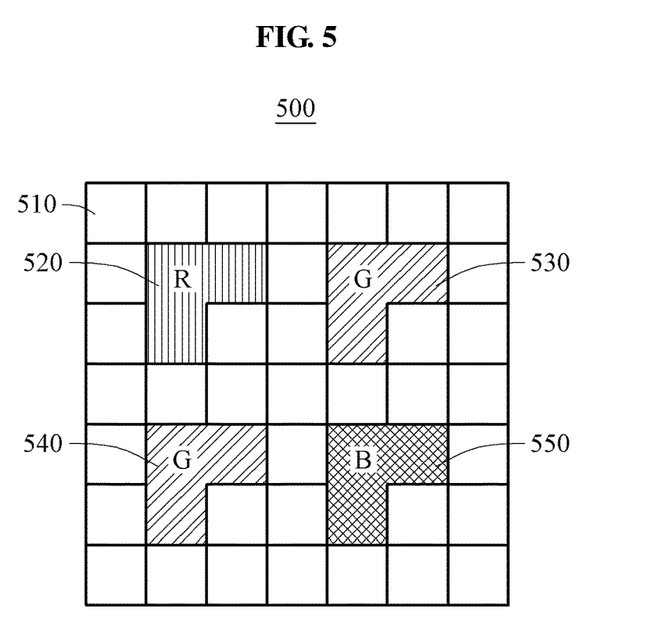
FIG. 5 is a diagram illustrating a pixel array of which a form of a color pixel sensing region is not rectangular according to at least one example embodiment.

FIG. 5 is a diagram illustrating a pixel array of which a form of a color pixel sensing region is not rectangular according to at least one example embodiment.

A color pixel sensing region in a pixel array 500 may have various forms. For example, each of color pixel sensing regions 520, 530, 540, and 550 may be formed in order that an area proportion of the color pixel sensing region 520, 530, 540, and 550 is three times an area proportion of non-color pixel sensors, for example, a non-color pixel sensor 510. Even when the forms of the color pixel sensing regions 520, 530, 540, and 550 are not rectangular, each of the color pixel sensing regions 520, 530, 540, and 550 may be disposed to be encompassed by the non-color pixel sensors.

Figure 6:
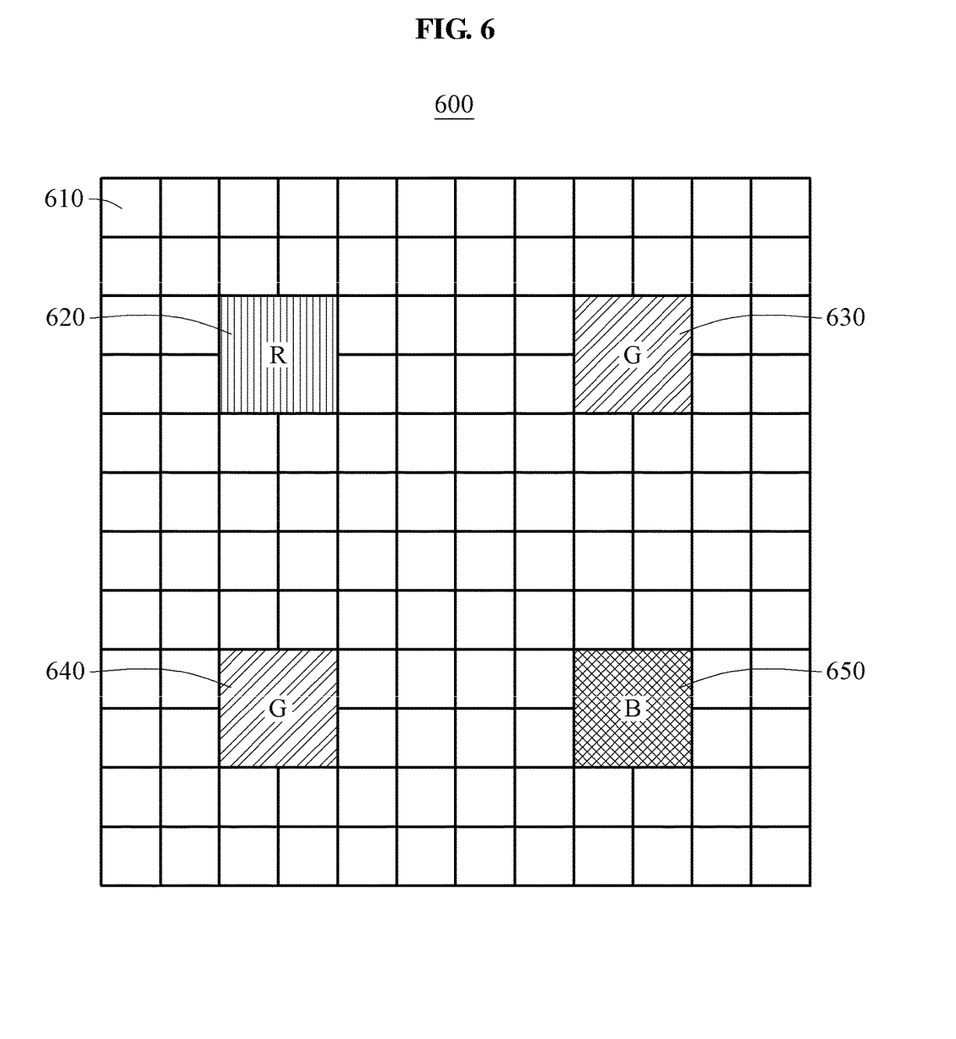
FIGS. 6 and 7 are diagrams each illustrating a pixel array of which an area proportion of a color pixel sensing region is adjusted according to at least one example embodiment.
Figure 7:
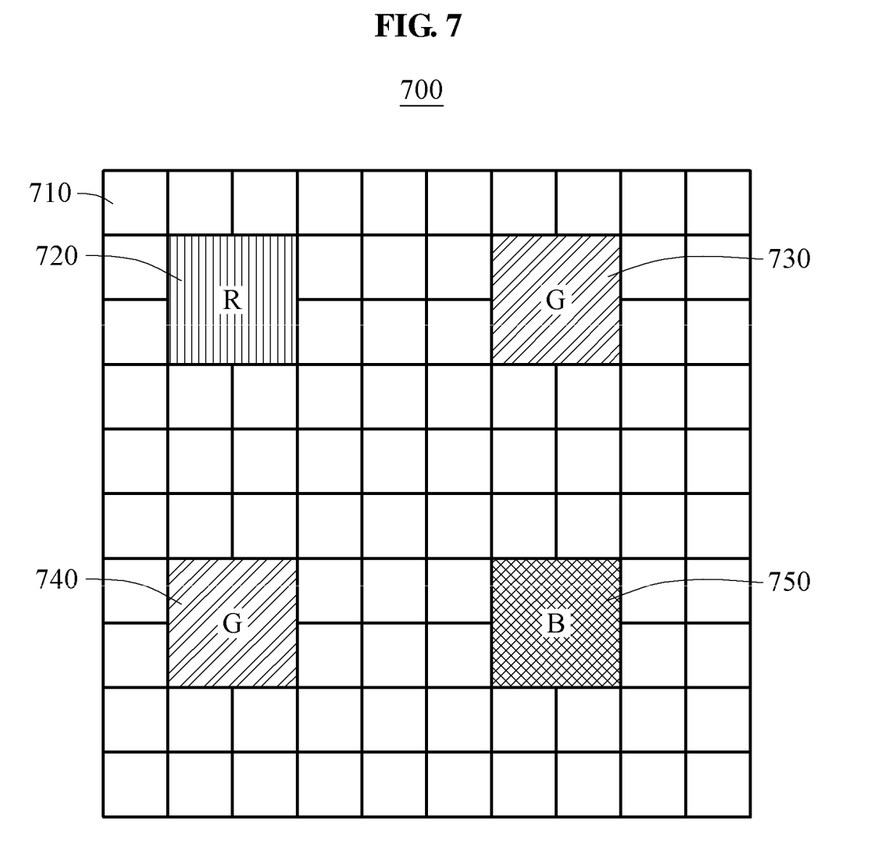

FIGS. 6 and 7 are diagrams each illustrating a pixel array of which an area proportion of a color pixel sensing region is adjusted according to at least one example embodiment.

A pixel array 600 of FIG. 6 includes a plurality of non-color pixel sensors, for example, a non-color pixel sensor 610, and a plurality of color pixel sensors 620, 630, 640, and 650. Each of the color pixel sensors 620, 630, 640, and 650 may be encompassed by the non-color pixel sensors.

A pixel array 700 of FIG. 7 includes a plurality of non-color pixel sensors, for example, a non-color pixel sensor 710, and a plurality of color pixel sensors 720, 730, 740, and 750. Each of the color pixel sensors 720, 730, 740, and 750 may be encompassed by the non-color pixel sensors.

According to at least some example embodiments, a distance between color sensing regions included in a pixel array may be determined based on an area proportion of a non-color pixel sensing region. For example, when an image sensor to generate an image is used in a low light environment, a relatively high area proportion of the non-color pixel sensing region may be required. When the relatively high area proportion of the non-color pixel sensing region is required, the distance between the color sensing regions may be relatively great.

Figure 8:
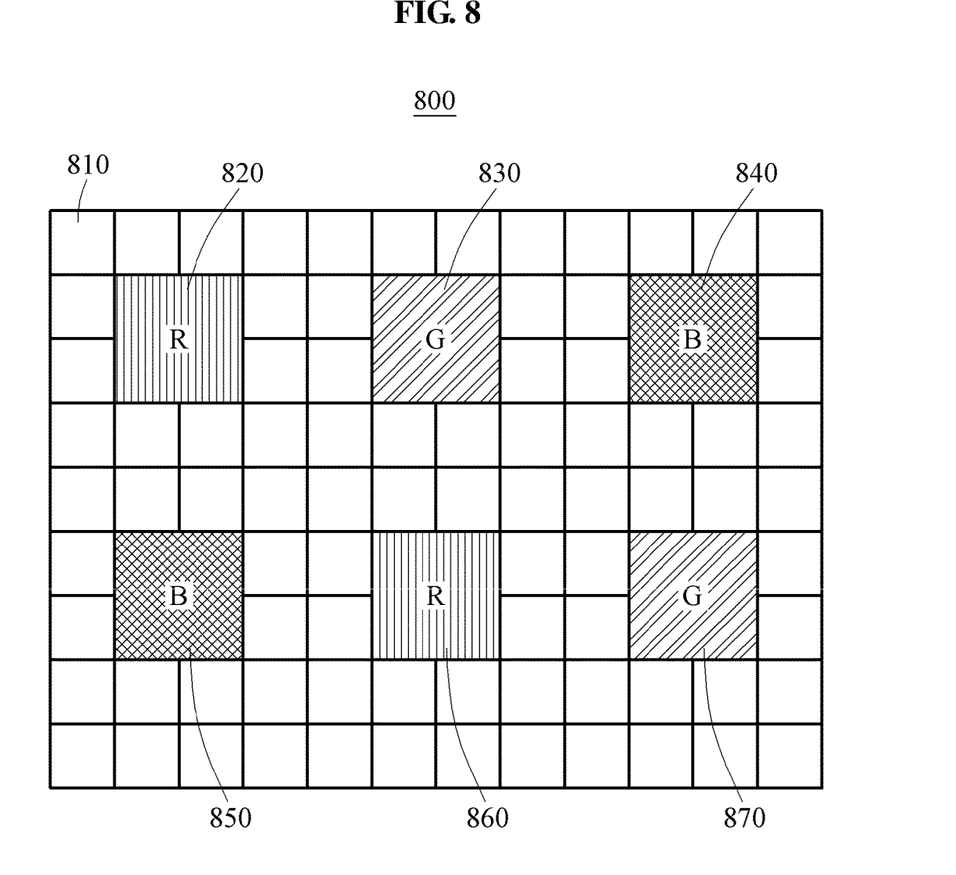
FIG. 8 is a diagram illustrating a pixel array of which a number of red pixel sensors, a number of green pixel sensors, and a number of blue pixel sensors are identical according to at least one example embodiment.

FIG. 8 is a diagram illustrating a pixel array of which a number of red pixel sensors, a number of green pixel sensors, and a number of blue pixel sensors are identical according to at least one example embodiment.

A pixel array 800 includes a plurality of non-color pixel sensors, for example, a non-color pixel sensor 810, and a plurality of color pixel sensors 820, 830, 840, 850, 860, and 870. Each of the color pixel sensors 820, 830, 840, 850, 860, and 870 may be encompassed by the non-color pixel sensors.

The color pixel sensors 820 and 860 are red pixel sensors, the color pixel sensors 830 and 870 are green pixel sensors, and the color pixel sensors 840 and 850 are blue pixel sensors. A number of color pixels sensors may be identical in a pixel array.

Descriptions of a structure of a pixel array of which an area of a non-color pixel sensor is greater than an area of a color pixel sensor have been provided with reference to FIGS. 2 through 8. Descriptions of a structure of a pixel array of which an area of a color pixel sensor is identical to an area of a non-color pixel sensor will be provided with reference to FIGS. 9 and 10.

<A Structure of a Pixel Array of which an Area of a Color Pixel Sensor is Identical to an Area of a Non-Color Pixel Sensor>

Figure 9:
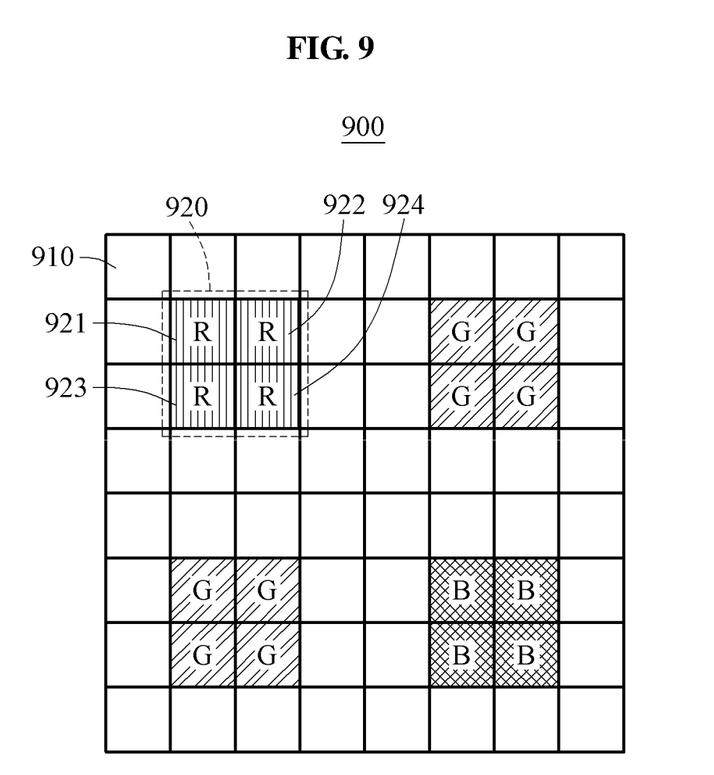
FIGS. 9 and 10 are diagrams each illustrating a pixel array in which binning is performed on other color pixel sensors according to at least one example embodiment.
Figure 10:
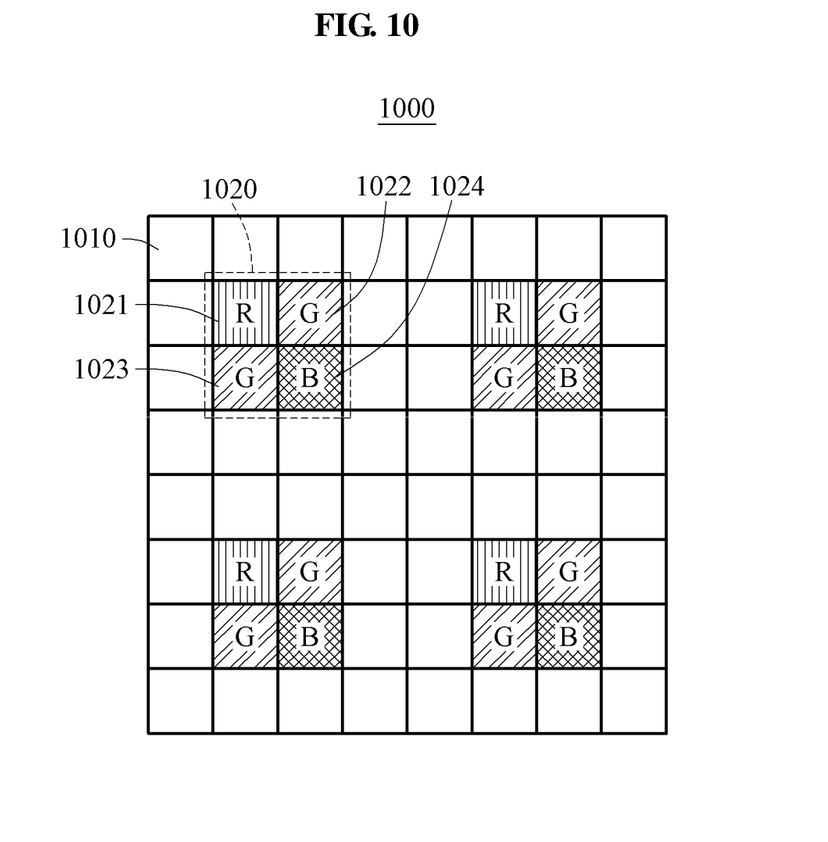

FIGS. 9 and 10 are diagrams each illustrating a pixel array in which binning is performed on other color pixel sensors according to at least one example embodiment.

A pixel array 900 of FIG. 9 includes a plurality of non-color pixel sensors, for example, a non-color pixel sensor 910, and at least one of color pixel sensing regions, for example, a color pixel sensing region 920. Each of the color pixel sensing regions may include a plurality of color pixel sensors. For example, the color pixel sensing region 920 includes color pixel sensors 921, 922, 923, and 924.

According to at least some example embodiments, the color pixel sensing region 920 may be operated as a color pixel sensor by combining values of the color pixel sensors 921, 922, 923, and 924. Concisely, a color pixel sensor of which an area is greater than an area of a non-color pixel sensor may be implemented by performing binning on a plurality of color pixel sensors of which areas are identical to an area of the non-color pixel sensor.

The color pixel sensors 921, 922, 923, and 924 may individually receive light and each generate an electric signal corresponding to an accumulated amount of charge. A signal for the color pixel sensing region 920 may be generated based on a plurality of electric signals generated by the color pixel sensors 921, 922, 923, and 924. For example, an average value of the electric signals may be the signal for the color pixel sensing region 920.

In the pixel array 900, an area proportion of color pixel sensing regions is 25%, and an area proportion of non-color pixel sensing regions is 75%. The area proportions may be identical to the area proportions of the pixel array 300 of FIG. 3. When the area proportions are identical, each image sensor may be identically operated in an identical low light environment.

A pixel array 1000 of FIG. 10 includes a plurality of non-color pixel sensors, for example, a non-color pixel sensor 1010, and at least one of color pixel sensing regions, for example, a color pixel sensing region 1020. Each of the color pixel sensing regions may include a plurality of color pixel sensors. The color pixel sensors included in each of the color pixel sensing regions may include a plurality of color pixel sensors each to receive a wavelength of at least one color. For example, the color pixel sensing region 1020 includes a red pixel sensor 1021, green pixel sensors 1022 and 1023, and a blue pixel sensor 1024. According to at least some example embodiments, the color pixel sensing region 1020 may include a magenta pixel sensor, a yellow pixel sensor, and a cyan pixel sensor. Each of the color pixel sensors may generate an electric signal for a corresponding pixel.

<A Color Pixel Sensing Region Encompassed by a Plurality of Non-Color Pixel Sensors> i) When a color pixel sensing region is encompassed by a plurality of non-color pixel sensors, the color pixel sensing region is spatially divided, such that a cross talk between color pixel sensing regions may not occur. When the cross talk does not occur, quality of a generated image may be enhanced.

ii) Since an area proportion of a non-color pixel sensing region is greater than an area proportion of a color pixel sensing region, an amount of light received for an identical amount of time may be increased. When the amount of light received for the identical amount of time is increased, a high-resolution image may be generated even in a low light environment.

<A Pixel Sensor Region of which an Area is Greater than an Area of a Non-Color Pixel Sensor> i) When an area of a color pixel sensor is increased, sensitivity of a corresponding pixel may be increased and a noise occurring in a low light environment may be reduced.

ii) Since a difference between a brightness measured by the color pixel sensor and a brightness measured by the non-color pixel sensor is decreased, fusion may be easily performed on a color image and a panchromatic image.

<Generating a Restoration Image for an Original Image Obtained by an Image Sensor>

Figure 11:
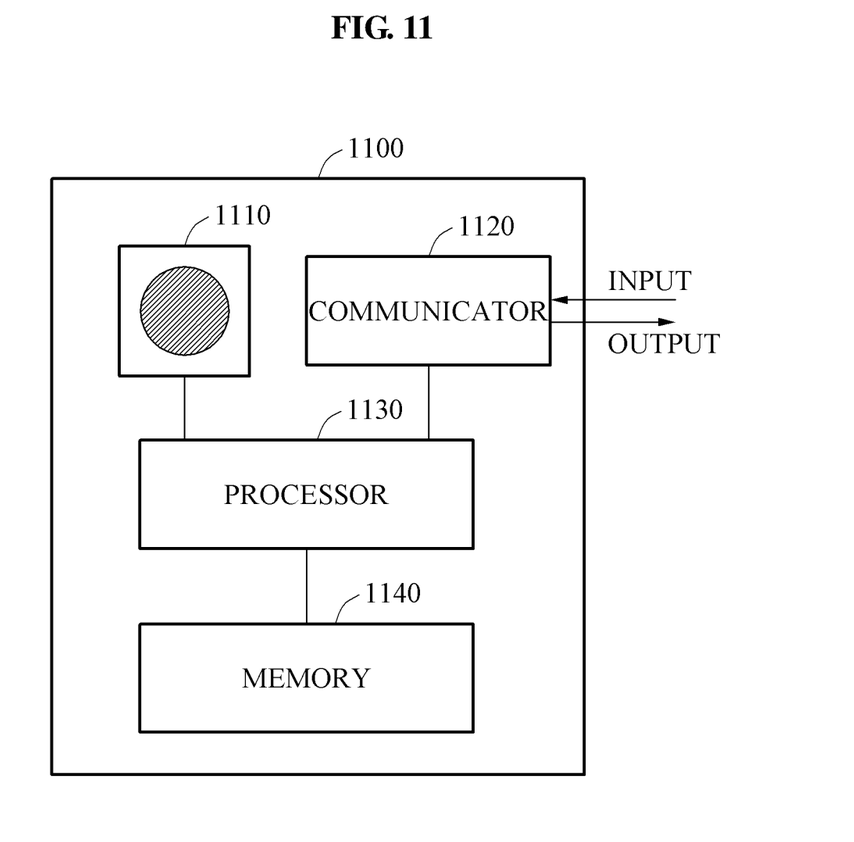
FIG. 11 is a block diagram illustrating an apparatus for generating a restoration image according to at least one example embodiment.

FIG. 11 is a block diagram illustrating an apparatus for generating a restoration image according to at least one example embodiment.

An apparatus for generating a restoration image, hereinafter also referred to as a restoration image generating apparatus 1100, includes an image sensor 1110, a communicator 1120, a processor 1130, and a memory 1140. For example, the restoration image generating apparatus 1100 may be an apparatus for generating a restoration image for an initial image through the image sensor 1110. Example embodiments of the restoration image generating apparatus 1100 include, but are not limited to, be a mobile phone, a closed circuit camera, and a digital camera. The image sensor 1110 may be the aforementioned image sensor 100.

The image sensor 1110 generates an image by receiving light. The image generated by the image sensor 1110 may be referred to as an initial image.

According to at least some example embodiments, the restoration image generating apparatus 1100 may include the communicator 1120. The communicator 1120 communicates with external apparatuses.

The processor 1130 processes data received by the communicator 1120, data stored in the memory 1140, and the initial image generated by the image sensor 1110. For example, the processor 1130 generates the restoration image by restoring the initial image.

The memory 1140 stores the data processed by the processor 1130.

Figure 12:
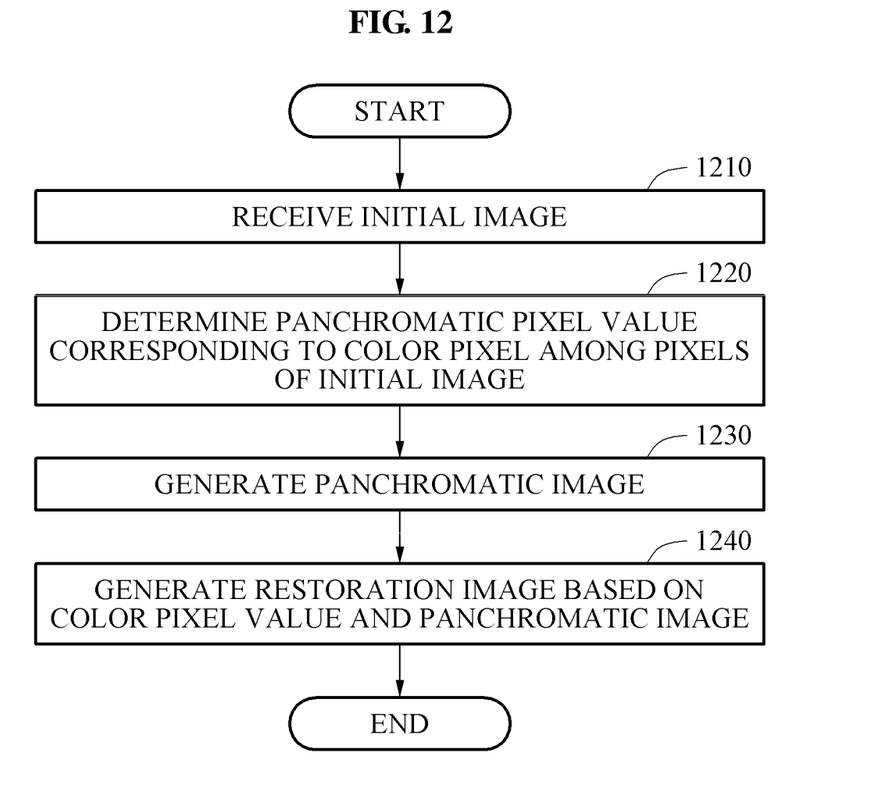
FIG. 12 is a flowchart illustrating a method of generating a restoration image according to at least one example embodiment.
Figure 13:
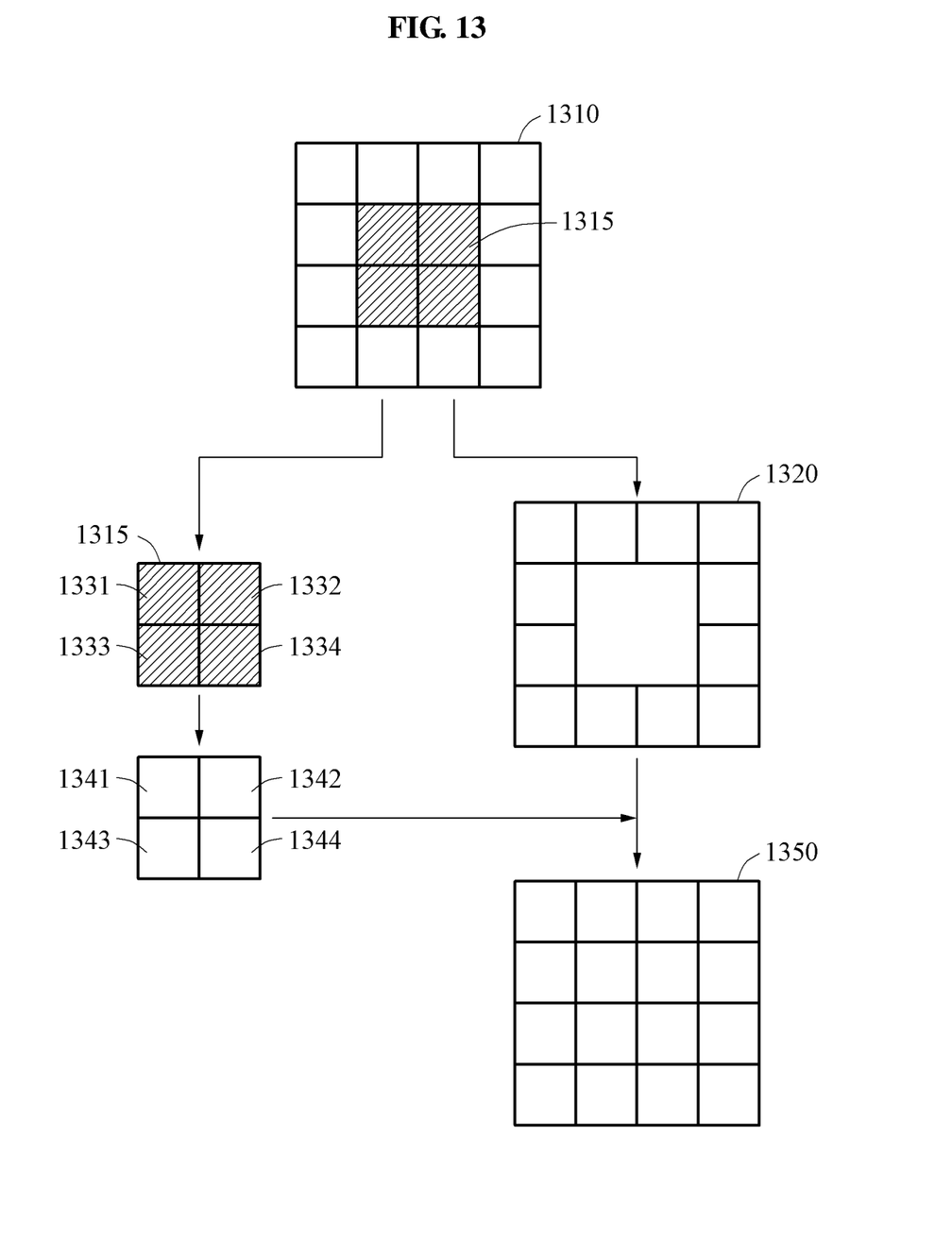
FIG. 13 is a flowchart illustrating a method of generating a panchromatic image according to at least one example embodiment.

Detailed descriptions of a method in which the restoration image generating apparatus 1100 generates the restoration image based on the initial image will be provided with reference to FIGS. 12 and 13.

FIG. 12 is a flowchart illustrating a method of generating a restoration image according to at least one example embodiment.

Operations 1210 through 1240 may be performed by the processor 1130.

In operation 1210, an initial image is received. For example, the initial image may be received by the image sensor 1110. Before operation 1210 is performed, the image sensor 1110 may generate the initial image by photographing a scene. The initial image may include a plurality of pixels, and each of the pixels may correspond to a pixel sensor of a pixel array of the image sensor 1110. An analog signal generated by the pixel sensor may be converted to a digital signal to be a pixel value of the initial image.

The initial image may include a plurality of non-color pixels and at least one color pixel region. Each color pixel region may be encompassed by the non-color pixels. Each color pixel region may include at least one color pixel, and each color pixel region may correspond to a color pixel sensing region of an image sensor. For example, each color pixel region of the initial image may have an area physically greater than an area of a non-color pixel. When a size of the color pixel sensor is greater than a size of a color pixel, a plurality of color pixels may correspond to one color pixel sensor. When the color pixels correspond to one color pixel sensor, a value of each color pixel may be identically set to be a value generated by the color pixel sensor.

In operation 1220, a panchromatic pixel value corresponding to a color pixel is determined from pixels among the pixels of the initial image. A non-color pixel value or the panchromatic pixel value corresponding to the color pixel having a color pixel value may be calculated.

In operation 1230, a panchromatic image is generated by setting the panchromatic pixel value to that of the color pixel. For example, a value of color pixels corresponding to a color pixel sensor among the pixels of the initial image may be changed to be the panchromatic pixel value.

In operation 1240, a restoration image is generated based on the color pixel value of the color pixel and the panchromatic image. For example, the restoration image may be generated by diffusing the color pixel value of the initial image to the panchromatic image.

FIG. 13 is a diagram illustrating a method of generating a panchromatic image according to at least one example embodiment.

An initial image 1310 may be generated by the image sensor 1110. The initial image 1310 includes a plurality of non-color pixels and at least one color pixel region 1315. A size of the color pixel region 1315 may be greater than a size of a single non-color pixel, and the color pixel region 1315 may be encompassed by the non-color pixels.

Panchromatic pixel values 1341, 1342, 1343, and 1344 corresponding to color pixels 1331, 1332, 1333, and 1334 included in the color pixel region 1315 may be determined.

A panchromatic image 1350 may be generated based on a pixel value of non-color pixel values 1320 of the initial image 1310 and the panchromatic pixel values 1341, 1342, 1343, and 1344 of the color pixels 1331, 1332, 1333, and 1334. For example, the panchromatic image 1350 may be generated by setting the panchromatic pixel values 1341, 1342, 1343, and 1344 as pixel values of color pixels of the initial image.

The units and/or modules described herein may be implemented using hardware components and software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An image sensor comprising:
a plurality of non-color pixel sensors each configured to sense a non-color signal; and
a color pixel sensing region including at least one color pixel sensor configured to sense a color signal,
wherein the color pixel sensing region has an area physically greater than an area of each of the non-color pixel sensors,
wherein the color pixel sensing region is encompassed by the non-color pixel sensors, and
wherein at least two non-color pixel sensors are placed between color pixel sensing regions.

2. The image sensor of claim 1, wherein each of the non-color pixel sensors is a panchromatic pixel sensor.

3. The image sensor of claim 1, wherein in a pixel array of the image sensor, a proportion of an area of the color pixel sensing region to an entire area of the pixel array is less than a proportion of an area of a non-color pixel sensing region to the entire area of the pixel array, the non-color pixel sensing region including the non-color pixel sensors.

4. The image sensor of claim 3, wherein the color pixel sensing region is configured to sense at least two colors from among red, green, blue, magenta, yellow, and cyan.

5. The image sensor of claim 3, wherein a distance between color pixel sensing regions included in the pixel array is determined based on the proportion of the area of the non-color pixel sensing region to the entire area of the pixel array.

6. The image sensor of claim 1, wherein the area of the color pixel sensing region is a multiple of the area of each of the non-color pixel sensors, the multiple being a real number greater than or equal to 2 and less than or equal to 9.

7. The image sensor of claim 1, wherein the color pixel sensing region includes one color pixel sensor configured to receive a wavelength indicating at least one color from among red, green, blue, magenta, yellow, and cyan.

8. The image sensor of claim 1, wherein the color pixel sensing region includes a plurality of color pixel sensors each configured to receive a wavelength indicating at least one color from among red, green, blue, magenta, yellow, and cyan.

9. An image sensor comprising:
a plurality of non-color pixel sensors each configured to sense a non-color signal; and
a color pixel sensing region including a plurality of contiguous color pixel sensors configured to sense color signals,
wherein the color pixel sensing region is encompassed by the non-color pixel sensors, and
wherein at least two non-color pixel sensors are placed between color pixel sensing regions.

10. The image sensor of claim 9, wherein the color pixel sensing region has an area physically greater than an area of each of the non-color pixel sensors.

11. The image sensor of claim 9, wherein, in a pixel array of the image sensor, a proportion of an area of the color pixel sensing region to an entire area of the pixel array is less than a proportion of an area of a non-color pixel sensing region to the entire area of the pixel array, the non-color pixel sensing region including the non-color pixel sensors.

12. The image sensor of claim 11, wherein the color pixel sensing region is configured to sense at least two colors from among red, green, blue, magenta, yellow, and cyan in the pixel array.

13. The image sensor of claim 11, wherein a distance between color pixel sensing regions included in the pixel array is determined based on the proportion of the area of the non-color pixel sensing region to the entire area of the pixel array.

14. The image sensor of claim 9, wherein the color pixel sensing region includes a plurality of color pixel sensors each configured to receive a wavelength indicating at least one color from among red, green, blue, magenta, yellow, and cyan.

15. A method of generating a restoration image, the method comprising:
receiving an initial image from an image sensor;
determining a panchromatic pixel value corresponding to a color pixel among pixels of the initial image;
generating a panchromatic image by setting the panchromatic pixel value to the color pixel; and
generating a restoration image based on a color pixel value of the color pixel of the initial image and the panchromatic image,
wherein the initial image includes a plurality of non-color pixels and one or more color pixel regions, and each of the one or more color pixel regions has an area physically greater than an area of each of the non-color pixels,
wherein each of the one or more color pixel regions is encompassed by non-color pixel sensors, and
wherein at least two of the non-color pixel sensors are placed between color pixel sensing regions.

16. The method of claim 15, wherein the generating of the restoration image includes generating the restoration image by diffusing the color pixel value of the initial image to the panchromatic image.

* * * * *